United States Patent
Sana et al.

(10) Patent No.: US 6,178,551 B1
(45) Date of Patent: Jan. 23, 2001

(54) METHOD OF AND SYSTEM FOR INSTALLING A COMPUTER PROGRAM

(75) Inventors: Keisha Sana, Nagareyama; Hiroyuki Ichioka, Meguro-Ku, both of (JP)

(73) Assignee: Japan Airlines Co., Ltd., Tokyo (JP)

( * ) Notice: Under 35 U.S.C. 154(b), the term of this patent shall be extended for 0 days.

(21) Appl. No.: 09/108,840

(22) Filed: Jul. 1, 1998

Related U.S. Application Data

(63) Continuation of application No. PCT/JP97/04674, filed on Dec. 18, 1997.

(30) Foreign Application Priority Data

Dec. 18, 1996 (JP) ................................. 8-338525

(51) Int. Cl.[7] ........................................ G06F 9/44
(52) U.S. Cl. ....................................... 717/11; 717/5
(58) Field of Search ................... 395/712, 200.51, 395/200.32, 653; 717/11, 5

(56) References Cited

U.S. PATENT DOCUMENTS

| | | | |
|---|---|---|---|
| 5,555,416 | * | 9/1996 | Owens et al. ............... 395/712 |
| 5,581,768 | * | 12/1996 | Garney et al. ............... 395/674 |
| 5,742,829 | * | 4/1998 | Davis et al. ............... 395/712 |
| 5,805,897 | * | 9/1998 | Glowny ............... 395/712 |

FOREIGN PATENT DOCUMENTS

| | | | |
|---|---|---|---|
| 5-346896 | 12/1993 | (JP) | .............. G06F/13/00 |
| 6-110663 | 4/1994 | (JP) | .............. G06F/9/06 |
| 6-222910 | 8/1994 | (JP) | .............. G06F/9/06 |
| 8-137768 | 5/1996 | (JP) | .............. G06F/13/00 |
| 09-114648 | * 5/1997 | (JP) | .............. G06F/9/06 |
| 09-218777 | * 8/1997 | (JP) | .............. G06F/9/06 |
| Y1E-0730 | 4/1998 | (JP) | . |

OTHER PUBLICATIONS

Dr. Dobb's Journal Japan, Dec. 1995.
Nikkei Open Systems, 1996.
L.B. Hickerson, et al., "Engineering workstations–managing network workstations," IEEE Spectrum, vol.29(4), pp.55, 56, 58, Apr. 1992.*
I. Sommerville and G. Dean, "Configuration Language Support for Software Installation," Proc. 2nd Int'l. Workshop on Configurable Distributed Systems, p. 209, Mar. 1994.*

(List continued on next page.)

*Primary Examiner*—Reba I. Elmore
(74) *Attorney, Agent, or Firm*—R. Lewis Gable; Cowan, Liebowitz & Latman, PC

(57) ABSTRACT

A method and a system which are capable of efficiently implementing an install of a program into a computer. The program installation is implemented when a great number of computers having different configurations are involved, when the computers are connected in a network, and when the stand-alone computers and the computers connected in the network are mixed together. The method of the present invention includes the steps of reading from a parameter file a content required for a predetermined process with reference to an environment of a computer into which the program is installed; calculating the content of the parameter file being read as an expression interpretive function representative of an expression form including a function; implementing the function included in the expression of the expression interpretive function when the expression interpretive function actually includes the function; implementing the predetermined process based on a result of the implementation; and installing the computer program so as to be adapted to the environment of the computer into which the computer program is installed by implementing the predetermined process.

1 Claim, 11 Drawing Sheets

OTHER PUBLICATIONS

T.W. Giorgis, "Get a grip on your networks," Digital News & Review, vol. 13(1), p. 16(3).*

B. Davis, "Desktop admin tools enhanced,"CommunicationsWeek, No. 603, p. 63(2), Apr. 1996.*

L.L. Sweet, "WinInstall still eases enterprise software installation," InfoWorld, vol. 18(1),p.No.1, Apr. 1996.*

"Software distributions," Network VAR, vol. 4(4),P.58(2), Apr. 1996.*

Y. Amir, et al., "Group Communication as as Infrastructure for Distributed System management," Proc. Third Int'l. Workshop on Services in Distributed and Networked Environments, pp. 84–91, Jun. 1996.*

H. Chang, "Mixed bag of asset management tools," PC User, No. 285, p. 35(2), Jun. 1996.*

G.A. Thompson, "Start a new enterprise plan with NAN," HP Professional, vol. 10(7), P. 18, Jul. 1996.*

K. Phillips, "Installation automation," PC Week, vol. 13(40), p. N6(2), Oct. 1996.*

* cited by examiner

METHOD OF AND SYSTEM FOR INSTALLING A COMPUTER PROGRAM

This application is a continuation of international application number PCT/JP97/04674, filed Dec. 18, 1997.

TECHNICAL FIELD

The present invention relates to an install process of a computer program, and more particularly to a method of and a system for installing a computer program in a multi-computer configuration.

BACKGROUND ART

An install process of a compute program can be classified into two groups. One of the groups is a method of installing a computer program into each computer, and the other one of the groups is a method of installing a computer program by utilizing a network.

1. Method of Installing a Computer Program into Each Computer.

When installing a computer program into each computer, an install process of a computer program into each computer is implemented by connecting a storage media such as a CD-ROM into which a program to be installed is stored to a computer for which an install of that program is desired, and by executing a program for use in an install on that computer. The program for use in the install refers to a designated parameter file, and implements an install process indicated by a content of the parameter file to which it is referred.

2. Method of Installing a Computer Program by Utilizing a Network.

When a number of the computers is connected through a network such as the Local Area Network (LAN), it would require a considerable amount of work for implementing an install of a program into each computer. Hence, a system manager implements an install of a program into a computer of an end user through the network, by using a server program specifically designed for managing the install.

However, in the above mentioned conventional method of implementing the install of the computer program into each computer, necessary information for the install, such as a file name, a directory, and the likes to be copied, is described in a parameter file. Because a fixed value or a reserved variable is given to a parameter, it is required to prepare a parameter file corresponding to a number of computers, or a user who actually installs the program needs to input that fixed value or a value of that reserved variable. Moreover, these install implementation modules must be produced for each program which is to be installed, therefore these produced install implementation modules can be used only for installing certain programs.

In a large scale system having thousands to tens of thousands of computers, it is impossible to maintain a computer environment for software and/or hardware as a constant, and as a result the effort to combine different environments is greatly increased. Hence, when implementing an install of a program for these computers, it is required to prepare the parameters suitable for a configuration of each of the computers. Accordingly, a software manufacturer that produces a parameter file of these parameters, and/or a system manager that manages the large scale system as described above, needs to spend a great amount of work such as accurately grasping a configuration or an environment of an individual computer, whereby the incidence of misoperations associated therewith will increase. Further, a communication or a transfer of the necessary information and a request of the work and the like would be difficult when the end user inputs a parameter, and as a result, it causes misoperations to occur. Then, when the problems such as described above occur, there exists problems such as it is possible that not only the work of installing can not be properly implemented, but also the involved programs and/or computers themselves which are operated until that point they can no longer can be utilized.

In the above mentioned conventional method of implementing the install of the computer program by using the network, since the server of managing the install manages a file associated with the install and a setting required for the management of the install, the system tends to be complex, and a management load on the server becomes heavier or larger for the system manager, and thus it is required to employ technologies, to use a server which includes a software and/or a hardware, and the like.

When the great number of computers is connected in the network such as the LAN, a combination of the computer that is subject to the install and a server for use in the install is fixed. Accordingly, in a case that the number of the servers for use in the install is relatively less than the number of the computers, the load would be concentrated, a great amount of time is required for the install, and there exists a problem that a malfunction would be occurred in the install operation as a result of a heavy load.

As the number of the servers for use in the install increases, since the frequency of implementing the install operations of the programs is very low compared to the normal operations, there exists a problem that the utilization of those servers is extremely low compared to the cost of the servers for use in the install.

Further, in an environment of which the standalone computers and the computers being connected in the network are mixed together, when implementing an install of a program into a computer, it is required to create an install file separately, depending upon whether the computer subject to the install is a stand-alone computer or a computer being connected in the network, and as a result, there exist the problems that the load of the install operation would be increased, and a probability of implementing the install operation would most probably be lowered.

DISCLOSURE OF INVENTION

Accordingly, it is an object of the present invention to provide a method and a system which are capable of efficiently implementing an install of a program into a computer or, in any event, into a system which is using a great amount of computers having different configurations, an environment of which the number of computers is connected in the network, and an environment in which the stand-alone computers and the computers being connected in the network are mixed together.

The object of the present invention can be achieved by the method and system of installing a computer program of the present invention installs the computer program based on an installer which installs the computer program with reference to an environment of a computer into which the computer program is installed when implementing an install of the computer program. Thus even where the system employs a significant number of different types of computer configurations, the install of a program can be implemented by creating one parameter file. Even when the computer is set up as a stand-alone or a server is connected through a network, an install can be implemented by using the same parameter and the install program. When a new facility will be required in the future, a new function can be called without changing the install program by changing only the parameter file. In case of installing from a server, it is not required to use a server dedicated to the install.

The method of installing the computer program of the present invention embeds a parameter into a source program in advance, compiles the source program embedded with the parameter, and properly installs a computer program into a computer with reference to that computer's environment. The computer program is installed by the source program, which is compiled while implementing an install of the computer program. Thus in a system where a number of different types of computer configurations exist in great quantities, an install of the program can be implemented by creating one parameter file. Also in the case where the computer is set up as a stand-alone and is connected to a server through a network, an install can be implemented by using the same parameter and the install program. When a new facility is required in the future, a new function can be called without changing the install program by changing only the parameter file. In the case of installing from a server, it is not required to use a server dedicated to the install.

The method of the present invention for installing the computer program from the parameter file into the computer reads the content required for the predetermined process with reference to the environment of the computer, calculates the content of the parameter file being read as the expression interpretive function representative of an expression form including a function, implements the function included in the expression of the expression interpretive function when the expression interpretive function actually includes the function, implements a predetermined process based on a result of the implementation, and installs the computer program to be adapted to the computer environment by implementing the predetermined process. Thus in the system where the types of computer configurations exist in great quantities, the install of the program can be implemented by creating one parameter file. Also in a case where the computer is set up as a stand-alone and is connected to a server through a network, the install can be implemented by using the same parameter and the install program. When a new facility is required in the future, a new function can be called without modifying the install program by changing only the parameter file. When the installation is made from a server, it is not required to use a server dedicated to the install.

The system for installing the computer program of the present invention is constituted of a parameter file unit including a predetermined parameter, a function unit including a predetermined function, an expression interpretive unit including a predetermined expression interpretive function, and a general purpose install unit for controlling the expression interpretive unit. The parameter file unit thereof includes a sequence control parameter, a process content parameter, and a control parameter. The function unit is configured to implement a process required from the expression interpretive unit and to return a value of the process result to the expression interpretive unit. The expression interpretive unit is configured to simultaneously read the parameter corresponding to the process from the parameter file unit, to call a function from the function unit when the parameter being read includes the function, and to implement a calculation of the parameter according to the operator so as to return the calculation result of the parameter to the general purpose install unit. The general purpose install unit reads the parameter corresponding to the process from the parameter file unit, calls the expression interpretive function from the expression interpretive unit according to the parameter being read, determines the sequence of each process based on the parameter being read, and implements the each of processes based on the sequence of determined process, whereby the program installed into the computer is adapted to the environment of that computer. Thus in the system where a large number of types of computer configurations exist, the install of the program can be implemented by creating one parameter file. Also in case where the computer is set up as a stand-alone and the server is connected through a network, the install can be implemented by using the same parameter and an install program. When a new facility is required in the future, a new function can be called without modifying the install program by changing only the parameter file. When the program is installed from the server, it is not required to use a server dedicated to the install.

BEST MODE FOR CARRYING OUT THE INVENTION

The preferred embodiments of a method of and a system for installing a computer program will be described in detail with reference to the accompanying drawings.

The general purpose installer (hereinafter, referred to as an installer) of the present invention implements an install process of a program by collecting the process functions required for installing a program, such as a) a confirmation of a free capacity of a disk memory, b) a production of a directory, c) a copy of a file, d) a registration of a set file, e) a registration of an icon, f) an deletion of an unwanted file, and g) an activation of an external program, and by providing the parameters corresponding to the respective processes.

Figure 1:
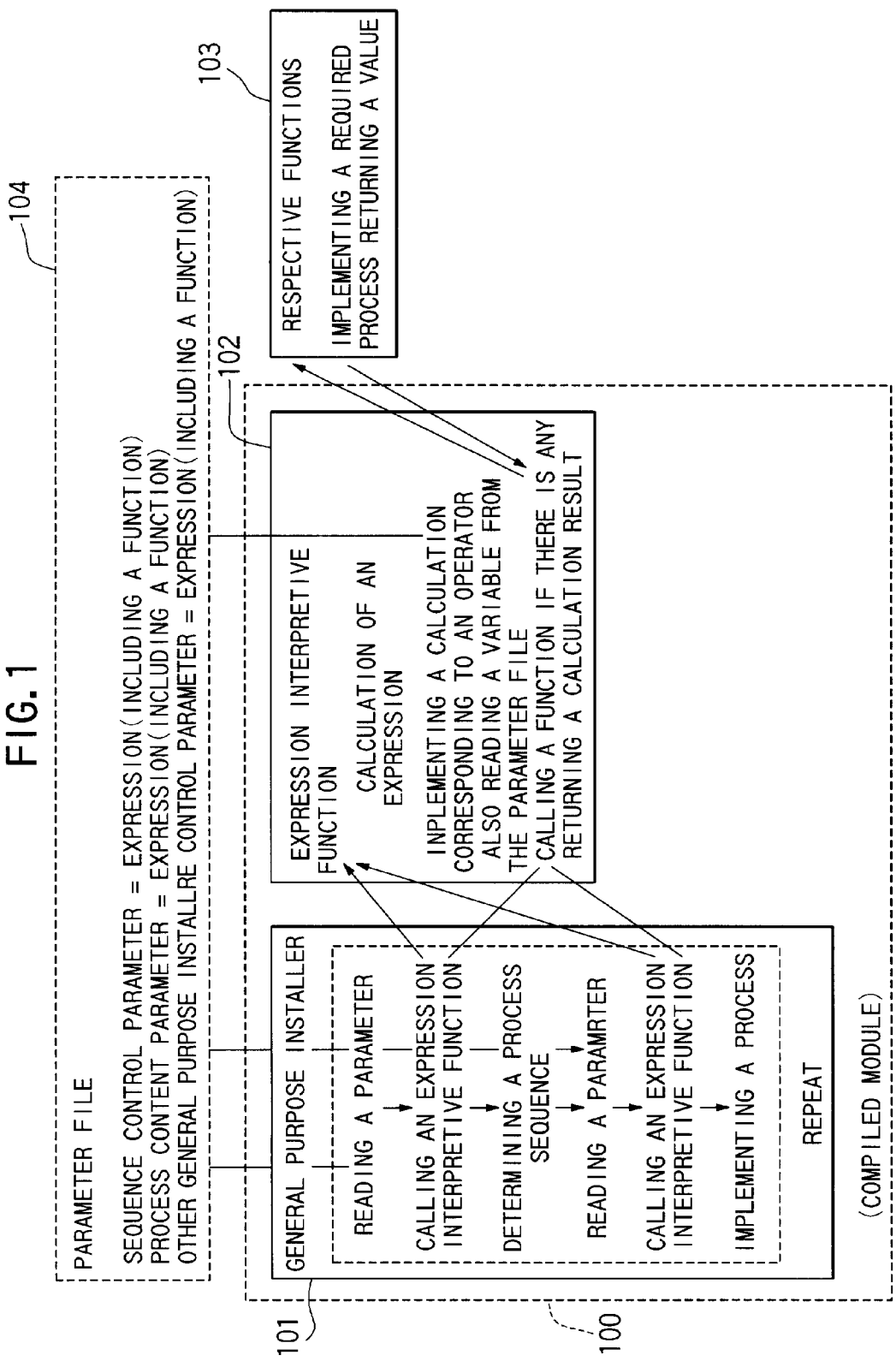
FIG. 1 is a schematic diagram showing a configuration of one embodiment of a system embedded with a general purpose installer of the present invention.

FIG. 1 shows the main components in one embodiment of the system in which the installer of the present invention is embedded. The system shown in FIG. 1 is provided with a compiled module 100 including an installer 101 and an expression interpretive function 102, a function 103 including the various functions, and a parameter file 104.

The parameter file 104 is constituted of a sequence control parameter (an expression including a function), a process content parameter (an expression including a function), and another installer control parameter (an expression including a function).

The installer 101 is a program which is constituted in such a manner that the respective process procedures such as reading a parameter from the parameter file 104, calling the function 103 from the expression interpretive function 102, determining a process sequence, reading a parameter from the parameter file 104, calling the function 103 from the expression interpretive function 102, and implementing a process are repeated as required.

The expression interpretive function 102 implements a calculation of a parameter (i.e., an expression including a function) in accordance with an operator attached thereto. In order to implement this calculation, the expression interpretive function 102 reads a parameter (a variable) from the parameter file 104, while calling a function from the function 103 when that function is included in the parameter, and returns a calculation result of the parameter to the installer 101.

The function 103 implements a required process from the expression interpretive function 102, and returns a value of a process result to the expression interpretive function 102.

That is, the installer 101 of the present invention reads from the parameter file 104 the contents required for a process, such as a sequence of the processes, a file name to be copied, and not utilizing the content of the parameter file being read as it is, but calculates the content being read as an expression interpretive function having a form of an expression in which the function 103 is included, and implements that function 103 being included in that expression when the function 103 is actually included in that expression (i.e., when it is the expression interpretive function 102), and obtains a value as a result thereof. Further, based on the value obtained, installing a computer program in order that the computer program would adapt to an environment of a computer into which the computer program is installed.

In the following, the present invention will be described with reference to more concrete embodiments.

For example, when a program to be installed is provided with a floppy disk, the install program must refer to a location where the program is to be installed, assuming that it has described the parameter file as follows in case of not using a function of the present invention.

PackageDir=A:V

However, since a drive in which the floppy disk is used is to be A: or B: according to the kind of computer involved, in order to normally implement an install process, it is required to produce a number of parameter files corresponding to the number of drives in which the floppy disk would possibly be used, or to employ a drive name recognized by the end user (hereinafter, it is referred to as a user) as by inputting the drive name in which the floppy disk is used, with a key, etc., at the time of installing the program.

Still, in the installer of the present invention, the above mentioned process can be implemented by using a function. For example, when creating a function of returning a drive name in which the floppy disk is used, and then setting a function name of the function as IIHGMakePathF.D", the parameter file using this function of the present invention can be described as follows.

PackageDir=HGMakePathFD("")

By describing this parameter file, the drive name in which the floppy disk is used can be returned, and thereby, it is no longer required to search or retrieve each time a drive name in which the floppy disk is used.

The following contents are described in a parameter file to which the installer refers.
(1) a program name to be installed
(2) a summary of the program to be installed
(3) the free capacity of the hard disc required for installing
(4) a version number of the program to be installed
(5) a condition for permitting (or not permitting) an install
(6) a sequence of the process of an install (e.g. file copy, etc.)
(7) a parameter required for the process of an install (e.g. file copy, etc)

The parameter required for a process of an install indicated in the above (7) may take the form of, for example, a directory name to be created, a file name to be copied, an icon name to be registered, etc.

Figure 2:
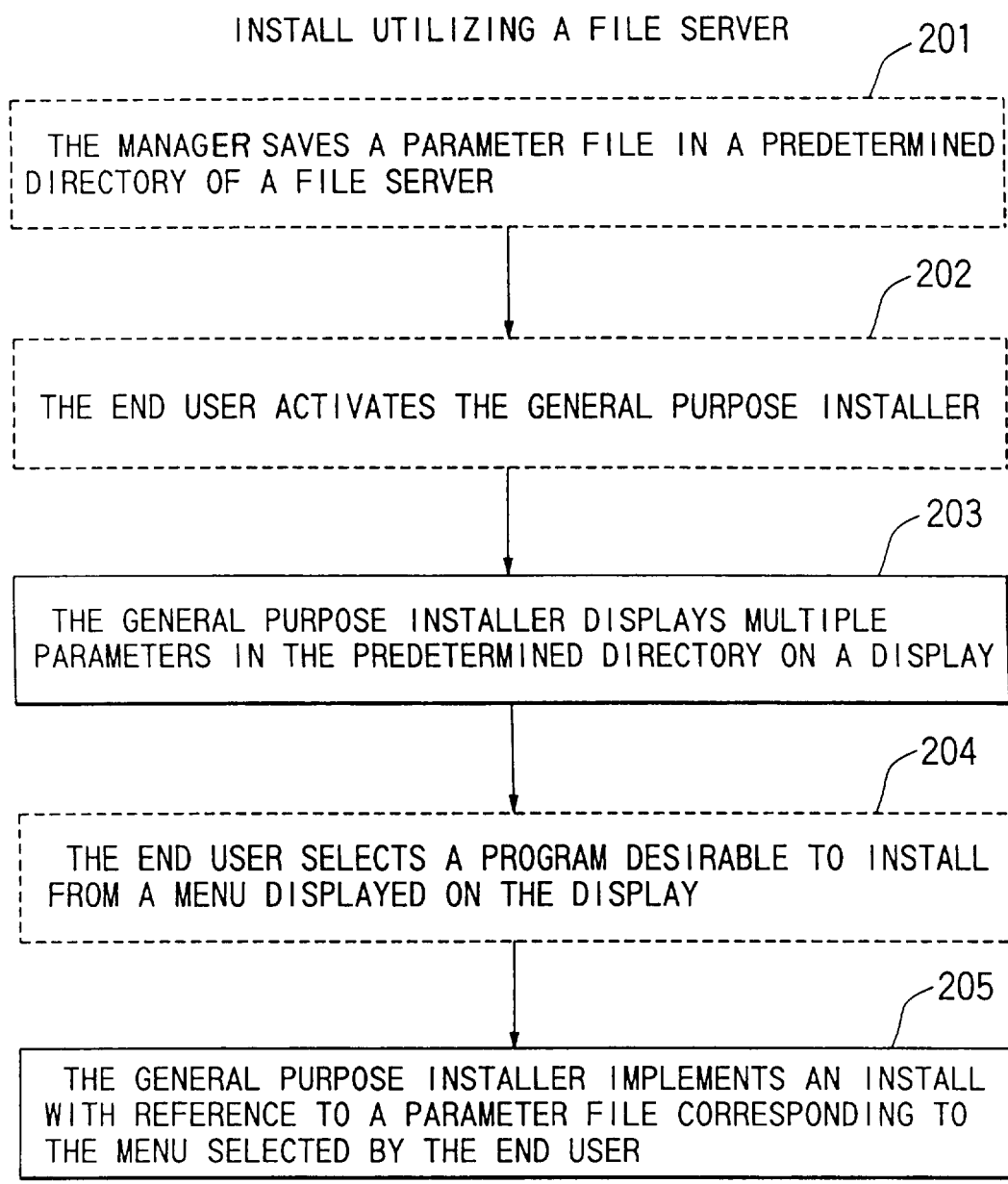
FIG. 2 is a flow diagram showing a process of program install implemented by the general purpose installer using a file server of the present invention.

FIG. 2 is a diagram illustrating the process of an install program according to the installer of the present invention, using a file server, in the following, the install method of the present invention will be described with reference to FIG. 2.

The manager saves a parameter file in predetermined storage location of the file server (step 201). Herein, the directory to be referred to by the installer is preset. Next, the end user activates the installer (step 202). The end user can install a desirable computer program, as long as he/she knows only a way of activating the installer. Then, the installer displays multiple parameter files in the preset directory on the display as a menu (step 203). Because in the respective parameter files, the contents to be displayed in the menu, as well as the conditions of whether the install will be allowed or not are described for a user having no right to install a program, the menu of that program is not displayed. Since the menu of the programs is displayed for a user having a right to install the program, the end user selects a program to be installed from the menu displayed on the display (step 204). The installer refers to the menu (the parameter file) selected by the user. Then, the installer refers to the parameter corresponding to the menu selected by the end user, and implements an install based on the content of the referred parameter file (step 205). The installer accepts or reads a sequence of the processes required for the install (e.g., creating a directory, copying a file, etc.) from the parameter file, evaluates the contents of these processes, and implements each of the processes according to the results of that evaluation.

In FIG. 2, the case of the installer being activated by the end user is described, but the installer of the present invention may be configured so as to be activated from a start box or to be activated through a program registered in the start box. Further, the installer of the present invention may be configured to be activated through a program of electronic mail, or to be activated through a browser program of the World Wide Web (WWW). Moreover, the installer of the present invention may be configured as to be activated through a program of a group ware, or for example, may be configured to be activated through other programs such as shell and the like.

Figure 3:
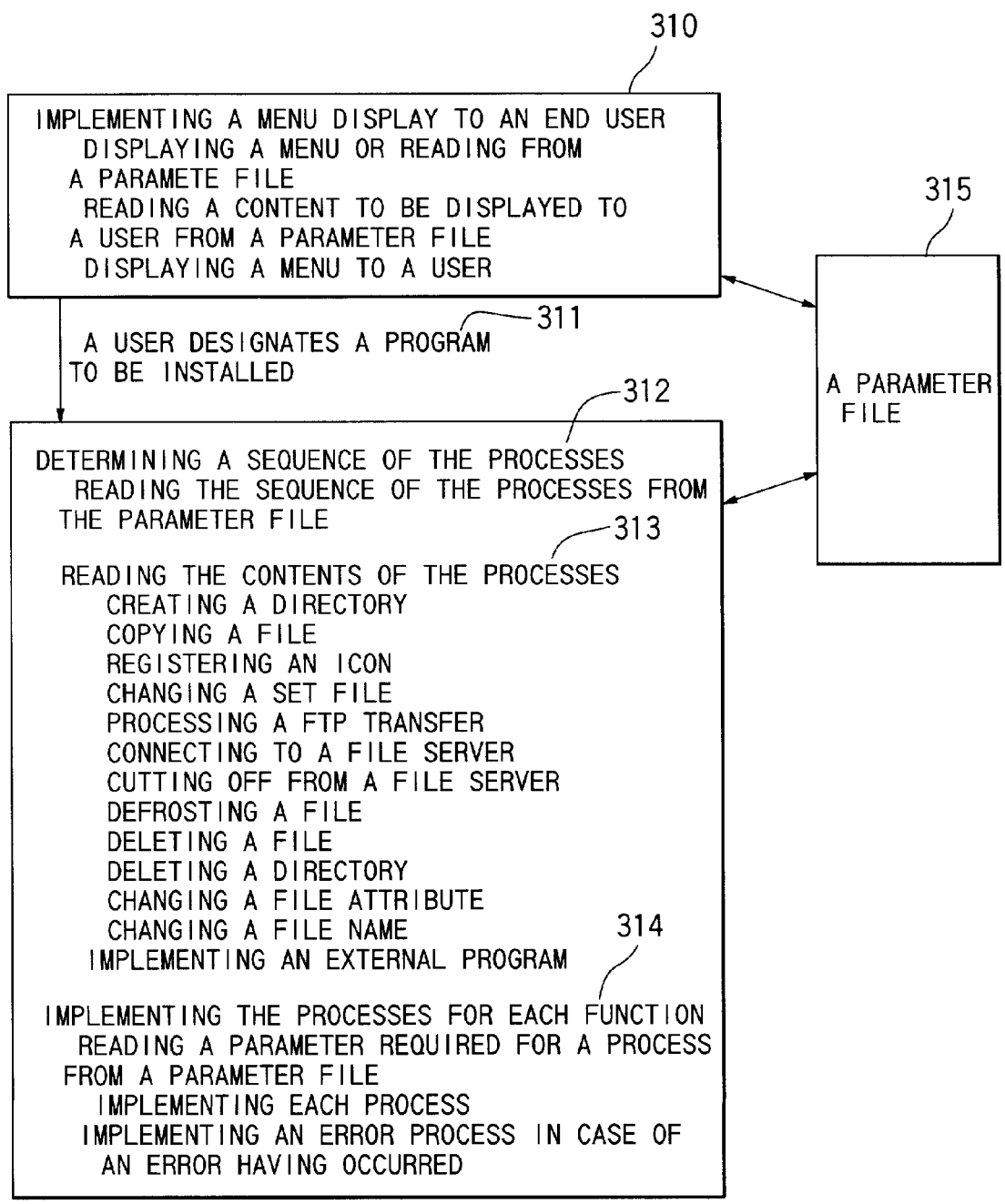
FIG. 3 is a diagram showing in detail the content of each process to be implemented by the general purpose installer of the present invention.

FIG. 3 is a diagram showing the contents of each processes to be executed by the installer of the present invention in detail.

The installer of the present invention, at first, implements a menu display to the end user (step 310). In this step 310, the following processes are executed:

Displaying the menu or reading from the parameter file;

Reading the content to be displayed to the user from the parameter file; and

Displaying the menu to the user.

After having displayed the menu to the user, the user designates a program to be installed (step 311).

Next, the sequence of the processes (step 312). In this step 312 is determined, reading the sequence of the processes from the parameter file.

Then, a read of the content of the process (step 313) is implemented. The steps of the processes are as follows:

A. Creating a directory
B. Copying a file
C. Registering an icon
D. Changing a set file
E. Processing a FTP transfer
F. Connecting to a file server
G. Cutting off from a file server
H. Defrosting a file
I. Deleting a file
J. Deleting a directory
K. Changing a file attribute
L. Changing a file
M. Implementing an external program Then, the process for each facility (step 314) is implemented. Then, the following processes are implemented:

Reading a parameter required for a process from, a parameter file;

Implementing each process; and

Implementing an error process when an error has occurred.

The installer of the present invention can implement an install process of a selected program by only preparing, even for a computer with a different environment, at least one parameter file which, describes a function which returns to the parameter file the values corresponding to the environment of the computer such as the free capacity of a disk, the directory configuration, the existence or the absence of a pre-existing file, and a version of a program and the like.

An expression (formula, equation) can be described in a parameter file which is used for the installer of the present invention. For example, assuming a function of returning a present date to be IIHGGetDate", and in a case that the installer does not have a right to implement an install when a parameter of "AddOnExcludeif" is true, then the function may be described as follows, AddOnExcludeIf=(HGGetDateo<"96/12/10")

whereby no install can be made before the date Dec. 19th, 1996, according to the above parameter file.

The installer of the present invention is configured to obtain a calculation result of an expression described in the parameter file, by utilizing an expression interpretive function.

For example, assuming "Evaluate" as an expression interpretive function, in order to acquire a parameter required for installing with the installer, a call expressed in the following form will be implemented.

Evaluate(I'AddOnExcludeif")

By implementing this call, the expression interpretive function reads from the parameter file the content as (HGGetDate( )<"96/12/10"), decides whether a returned value (a current date) of IIHGGetDateo is smaller (i.e., earlier than that date) or not, and then returns a "True" when it is smaller or a "False" when it is not smaller. Herein, the installer using the expression interpretive function is a compiled program.

The installer is designed to implement a process by selecting from all of the functions that express interpretive function, which reads a parameter required for an install process from the parameter file.

For example, the a logic of a decision as to whether the install is implemented or not is coded as follows:

if Evaluate(I'AddOnExcludeif") then
  (description of an install process)
else
  (description of an install disable process)
endif.

The installer calls the expression interpretive function for an interpretation or a calculation of the expression. Since this expression interpretive function is configured to dynamically call a function of another module, in order to implement the interpretation or the calculation described in the parameter file, the addition of that function can be easily implemented. That is, the adding of a function, compiling the installer is not required, but it is only needed to describe a function to be used in a parameter file.

For example, an install process can be executed by downloading a file from a computer having a standard communication server facility (e.g., FTP server) with a communication capability, by mounting a standard communication client facility, such as a FTP for implementing a file transfer, on the installer, even if the file to be copied to a computer is not in an accessible media at the time of implementing an install.

Since the sequence of the processes is also described on the parameter, a branching of the processes can be implemented according to the environment. For instance, in case of intending to control the sequence of the processes described on a parameter file with a parameter such as "Install, 2,3", it is possible to implement such branching by describing the expression (herein, a three term operator which means a condition, an operator of "?:" type, on a parameter file.

Install1=DirExist ("C:YAPL")?"Mkdir":"VOP"
Install2="Copy"
Install3="Icon"

In case of the above example, implementing "Mkdir", (a creation of the directory) if the directory called 'IC.YAPL" exists, or indicating "NOP11 (no implementation) if the directory does not exist, and then indicating to implement the processes of "Copy' (a copy of the file), and of "Icon" (a register of the icon).

Further, an example of a case for changing a file and the like to be copied according to an environment of a computer is as follows.

CopiedFile=IsWin31( )?"apl16.exe":"apl32.exe"

In this example, the file name to be copied is described by the parameter called "CopiedFile", and copying 11apl16.exe' if a computer satisfies the condition called '1isWin31( )', or copying "apl32.exe" if it does not satisfy the condition called isWin31 ( ) 11.

An expression interpretive function calls a function as described above. Then to call the function, the file name of a new module and the type of the function to be called are described by a parameter file when calling a function of a newly created module. That is, the expression interpretive function reads the calling type of the function from the parameter file, places the parameter of the function to be called into a memory (actually a stack), loads the new module into the memory, and calls the function to be called.

For example, assuming a module named 'NewModule.d.11, and a function named "NewFunco, then a new function may be called by implementing the descriptions such as described below in a parameter file.

FileName=NewFunc( )

[Declares]

NewFunc=NewModule.dl1 G Wherein, [Declares] indicates an addition, and G indicates a form of a return value.

In general to establish a definition of the function, it is required to provide a parameter to the function and to return a value by implementing a process within the function, but similarly in case of adding a facility, the facility can be added by describing a function in a parameter file so as to process a facility thereof within the function. Further, since the installer is included with a facility for activating an external program, it is possible to add a facility by newly creating a program including an additional facility, and by describing it into the parameter so as to activate the newly created program.

For instance, assuming the newly created program to be "NewProg.exe1, it can be described in the parameter file as follows.

joint1="NewProg.exe"

Wherein "joint1" is a key word of a process for activating an external program.

In a case that the installer has a standard communication facility, it is possible to obtain a necessary file through a network. For example, in a case where the installer provides a facility for receiving a file with the FTP (File Transfer Protocol), it is possible to receive a file from the FTP server located at a remote place by implementing a description for a receipt in a parameter file, as indicated below.

PackageFile="/apl/*.*"

TargetDir=HGmakcPathTargetRoot("apl")

HostAddr=HGGetNearestHost( )

User=HGGetNetUser( )

Passwd=""

Mkdir1=TargetDir

Ftp_Get1=PackageFile+HGTab( )+TargetDir( )+HGTab( )+HostAddr+HGTab( )+User+HGTab( )+Passwd Wherein Mkdir1 is a parameter for creating a directory, Ftp_Get1 is a parameter showing the file receipt. In this Ftp_Get1 parameter, an address of the FTP server is provided where a file actually exists, and a directory, and a part of the user's computer to where the file is received (copied) are described respectively.

In a parameter file of the FTP transfer example as described above, "HGmakePathTargetRoot( )" indicates a function for returning a target drive of an install, "HGGetNearestHost( )" indicates a function for returning the most suitable address of the FTP server, "HGGetNetUser( )" indicates a function for returning an user name, and 'HGTab( )" indicates a function for describing a break of a parameter, respectively.

Next, an example of a standard communication facility of the installer is described as:

Implementing a creation of a directory

```
Directory=Evaluate("Mkdir1")
if Directory!="" then
    if exist(Directory)=FALSE then
        Mkdir Directory
    endif
endif
Implementing a receiving process at the FTP
FtpParm=Evaluate("Ftp-Get1")
if FtpParm!="" then
    RemoteFile=HGGetField(FtpParm,0)
    LocalDir=HGGetField(FtpParm1,1)
    HostAddr=HGGetField(FtpParm1,2)
    LoginName=HGGetField(FtpParm1,3)
    Password=HGGetField(FtpParm1,4)
    if Connect(HostAddr)=FALSE
        An Error Process
    endif
    if Login(LoginName, Password)=FALSE
        An Error Process
    endif
    if Get(RemoteFile.LocalDir)=FALSE
        An Error Process
    endif
endif
```

In a case where a medium for implementing an install exists in a file server but that medium is not connected to that file server at a time when implementing the install, the file server has a facility for connecting that medium to a file server for use in the install in accordance with the content described in the parameter file and for automatically cutting off that medium from the file server for use in the install at a time when the install has been completed.

It is not required that the parameter file must be accessed at a stage before the computer for implementing an install executes the install and the parameter file or a parameter can be obtained from another computer connected to the network, through the communication facility, by mounting the communication client facility on the installer.

As a result of this arrangement, the system manager can install a program into a computer which is utilized by a user, by either providing a parameter file on a computer operable by the system manager or by inputting a parameter into that computer by the system manager.

The installer is a program configured not to be controlled by a specific server but to be operated as a stand-alone. As a result of having such a configuration, it is not required to provide separately a dedicated server. That is, the installer does not operate by interacting with a dedicated server program, but rather operates in a stand-alone environment.

If the installer (i.e., the program) is activated when a parameter file is not designated, a plurality of parameter files that existed in a preset directory are displayed on a screen of a display as a menu for use in the install. Also when the parameter file is configured as a parameter, the install process described in the parameter file is automatically implemented. By providing a special extension to a parameter file with this facility and by associating that extension with the installer, the system manager can attach the parameter file to the various kinds of applications, whereby the menu of the install and an activation system of the installer can be easily constructed.

An application (e.g., an electronic mail or the WWW browser) capable of reading and implementing an attached file from a designated program can designate a program to be activated, in accordance with an extension of the file to be attached.

Accordingly if a file having an extension called ".PLT" is attached by setting an application to activate the installer, by adding the extension called ".PLT" to the parameter and, then, by attaching them to the application, the install process can be implemented by activating the installer with that application.

For example, the setting of a program name of the installer as "Install-exe" and of an extension of the parameter as ".PLT" relates the PLT extension with the Install.exe pre-mounted in the computer by electronic mail. If a parameter file is named for installing one application as "appl.plt", only "appl.plt" is applied to and transmitted by the electronic mail to an end user and the end user having received this name by opening the attached "appl.plt", the command line of "Install.exe appl.plt" is implemented in the computer of the end user before the installer implements a designated install with "appl.plt".

Figure 4:
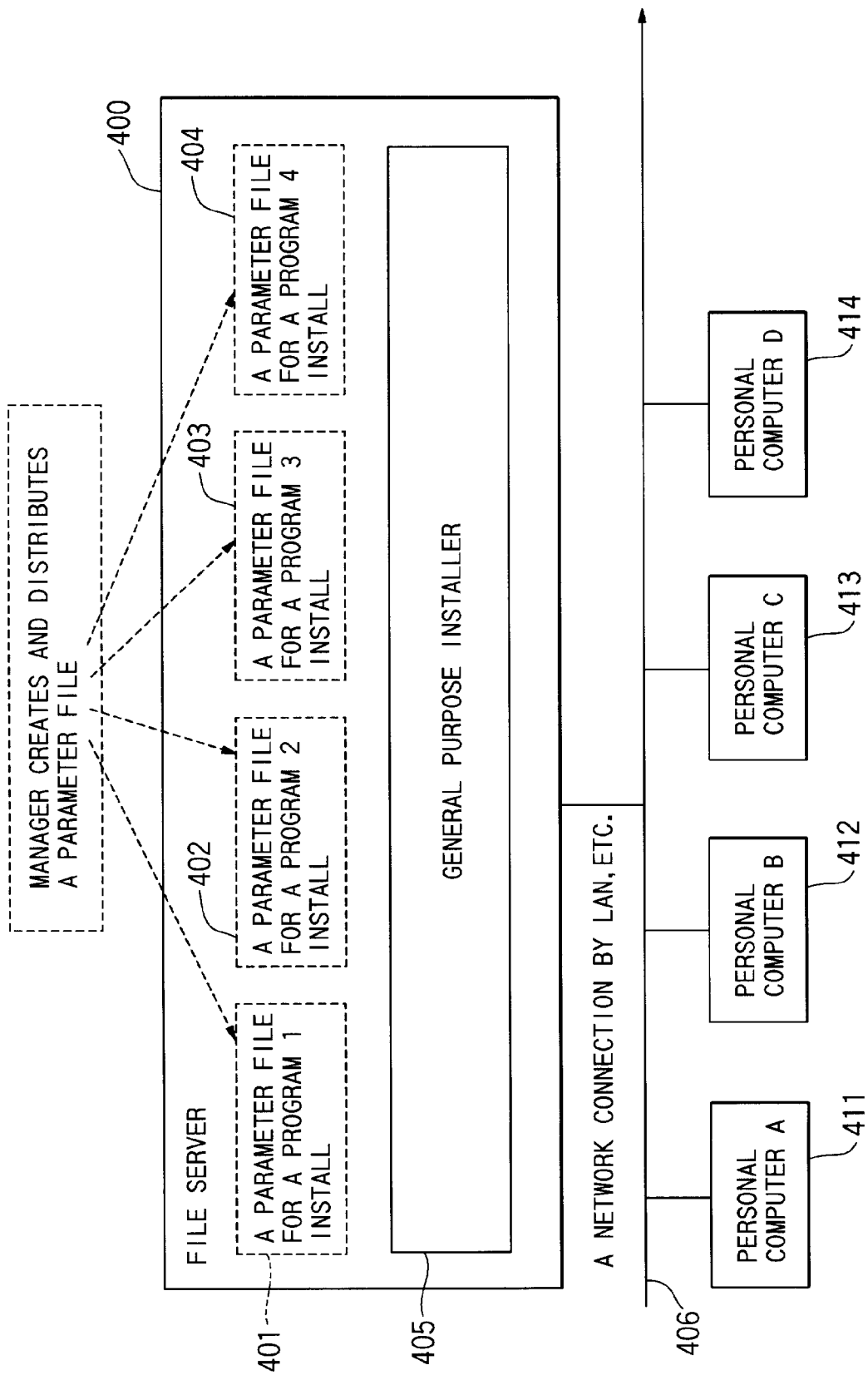
FIG. 4 is a schematic diagram showing a configuration of one embodiment of a system of which a general purpose installer of the present invention is embedded on a file server side.

FIG. 4 is a diagram showing one embodiment of a system of which the installer of the present invention is embedded in a file server side. In this embodiment, a manager creates a parameter file and distributes it to a file server.

In the system shown in FIG. 4, four personal computers (hereinafter, referred to as PC) 411, 412, 413, and 414, are connected by a network such as the LAN to a file server 400, which includes a parameter file 401 for use in an installment of a program 1, a parameter file 402 for use in an installment of a program 2, a parameter file 403 for use in an installment of a program 3, a parameter file 404 for use in an installment of a program 4, and the installer 405 of the present invention.

Next, referring to FIGS. 3 and 4, a procedure of the install process of a program 1 using the installer 405 of the present invention with the PC 411 will be described.

When a user activates the PC 411 to implement the process of installing the program 1 into the PC 411, the installer 405 reads the parameter file 401 for use in the program 1 install. Each of the parameter files 401–404 for use in the program install is encoded as to the conditions of whether the install of all programs connected to the server would be allowed or not are described, and the user of the PC 411 has a right to install all programs connected to the server. The information required for an install of a program will be displayed for the uses of the PC 411 on a display (not shown) of the PC 411 as a menu. However, if the user of the PC 411 does not have a right to install all programs connected to the server, then the menu thereof (the information required for an install of the program) will not be displayed.

Herein, assuming that the user of the PC 411 has the right to install all programs connected to the server, then the information required for the install of all programs is displayed as the menu. The user of the PC 411, who has the right to install all programs, selects the program 1 desired to install by looking at the menu, and instructs the installer 405 to implement the install of the program 1. The installer 405 reads the parameter file 401 for use in the program 1 of which the user of the PC 411 has instructed the installer 405 to install, and starts the install process of the program 1. The installer 405 reads a sequence of the processes (e.g., a creation of a directory, a copy of a file, etc.) required for the install from the parameter file 401, decides the contents (e.g., a creation of a directory, a copy of a file, etc.) of these processes, and implements the respective processes (a creation of a directory, a copy of a file, etc.) corresponding to a result of that decision.

Although the conditions of whether the install of all programs connected to the server would be allowed or not are described in the above embodiment for each of the parameter files 401–404 used in the program install, those files 401–404 may be configured to describe the conditions of whether an install of a specific program connected to the server would be allowed or not but not the install of all programs connected to the server. For example, the parameter file 402 for use in the program 2 install may describe the condition of whether the install of only the programs 2 and 4 connected to the server is allowed or not. Also, file 402 may be configured as being always not allowed or as being always allowed for other programs 1 and 3. That is, it may be arranged that a content of a parameter configuration can be changed freely by the manager.

In the course of installing a computer program in a computer to thereby adapt the environment of that computer, the installer of the present invention is configured to automatically create a procedure for returning to the former environment of that computer before the computer program was installed. For example in the configuration of FIG. 4, when the user of the PC 411 starts the install process of the program 1 using the installer 405, the installer 405 automatically creates a procedure for returning the environment of the PC 411 to the former environment before the program 1 was installed, and thereafter, when the user of the PC 411 executes an uninstall process of the program 1, it is arranged to automatically return the environment of the PC 411 to the former environment in which the program 1 was installed according to the procedure created earlier.

Because the installer of the present invention has the capability of uninstalling the installed computer program, the end user will not forget to change the environment of the computer to the former environment in which the computer program was installed. Also it is no longer necessary to implement the process of returning to the former environment during each program of computer program installation by managing the environment of the computer at each time when uninstalling the computer program.

Figure 5:
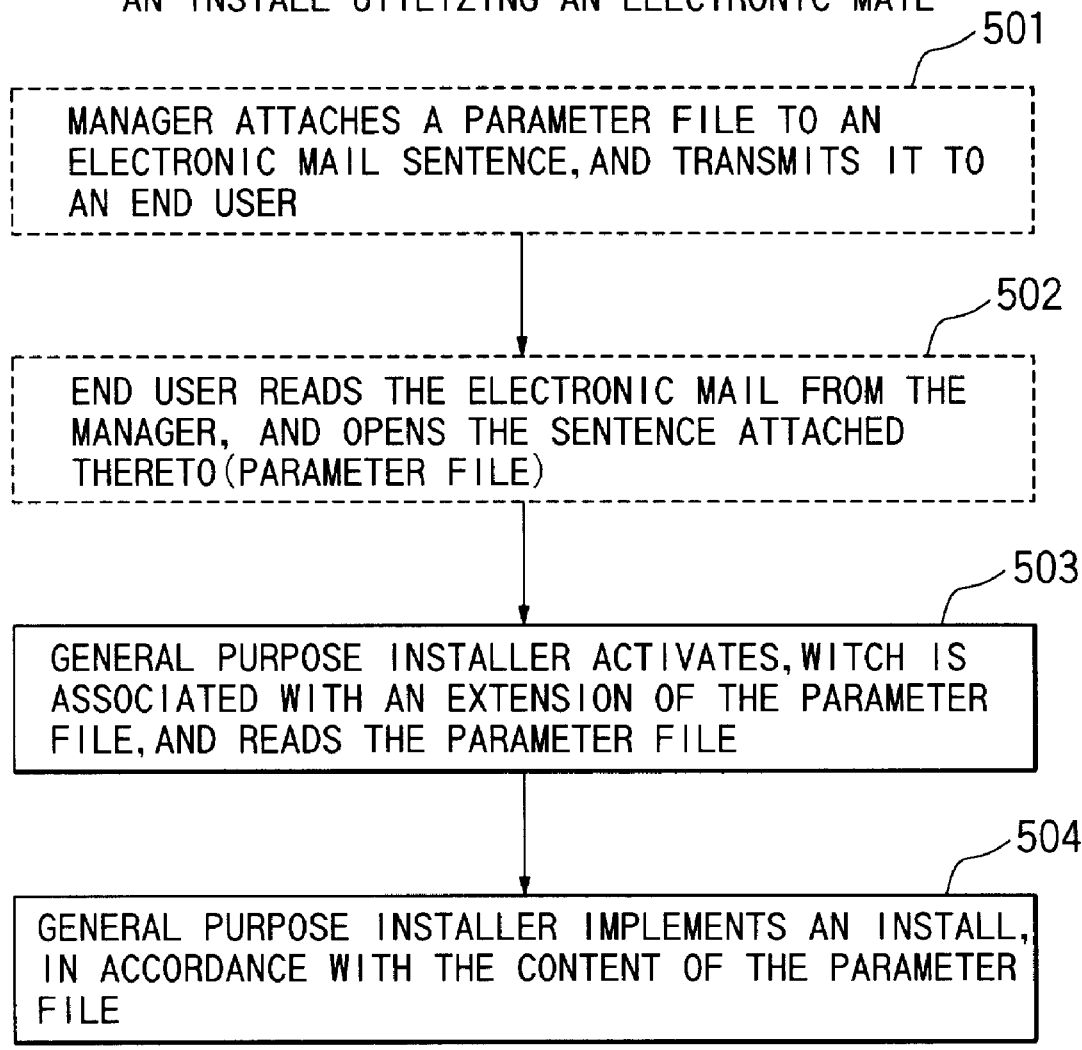
FIG. 5 is a flow diagram showing a method of installing a computer program by utilizing electronic mail and the general purpose installer of the present invention.

FIG. 5 is a flow diagram showing a method of installing a computer program by utilizing electronic mail with the installer of the present invention.

The manager transmits to the end user the parameter file by attaching it to an electronic mail document (step 501). The electronic mail reaches the end user from the manager through a network. Next, the end user reads the electronic mail from the manager, and opens the document (parameter file) attached to the electronic mail (step 502). The installer of the present invention has been associated with the extension of the parameter file in advance. Then, the parameter file is read by activating the installer associated with the extension of the parameter file (step 503). The electronic mail will set the parameter file name as a parameter when activating the installer. Then, the installer implements an install process of the computer program in accordance with the content of the parameter file (step 504).

Figure 6:
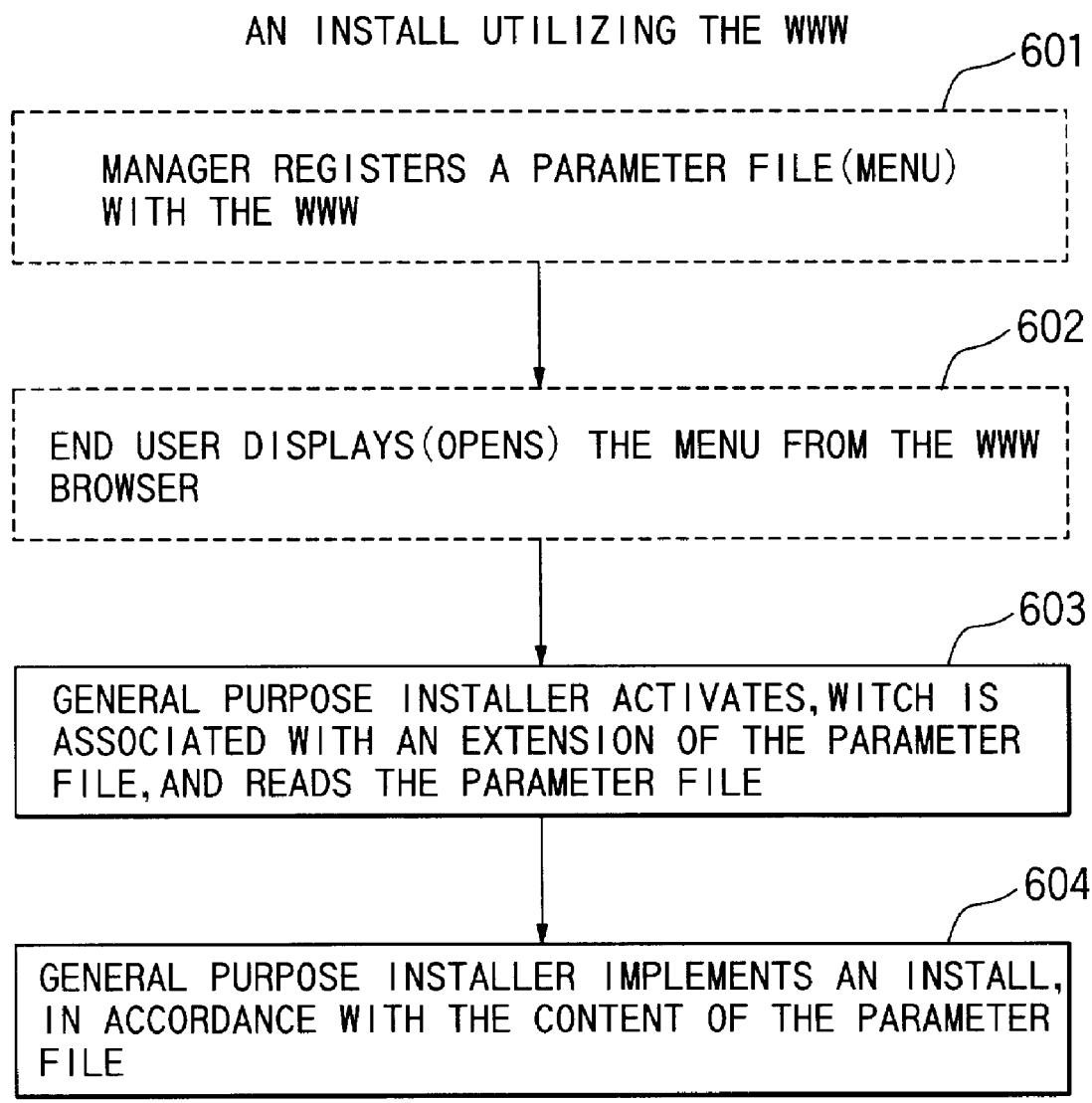
FIG. 6 is a flow diagram showing a method of installing a computer program by utilizing the WWW (World Wide Web) and the general purpose installer of the present invention.

FIG. 6 is a flow diagram showing a method of installing a computer program over the WWW (World Wide Web) by using the installer of the present invention. In the following, the install method will be described by FIG. 6.

A manager registers a parameter file (menu) with the WWW (step 601). Next, an end user displays (opens) the menu from the WWW browser (step 602). Then, the parameter file is read by activating the installer associated with the extension of the parameter file (step 603). Thereafter, the installer implements an install process of the computer program in accordance with the content of the parameter file (step 604).

Figure 7:
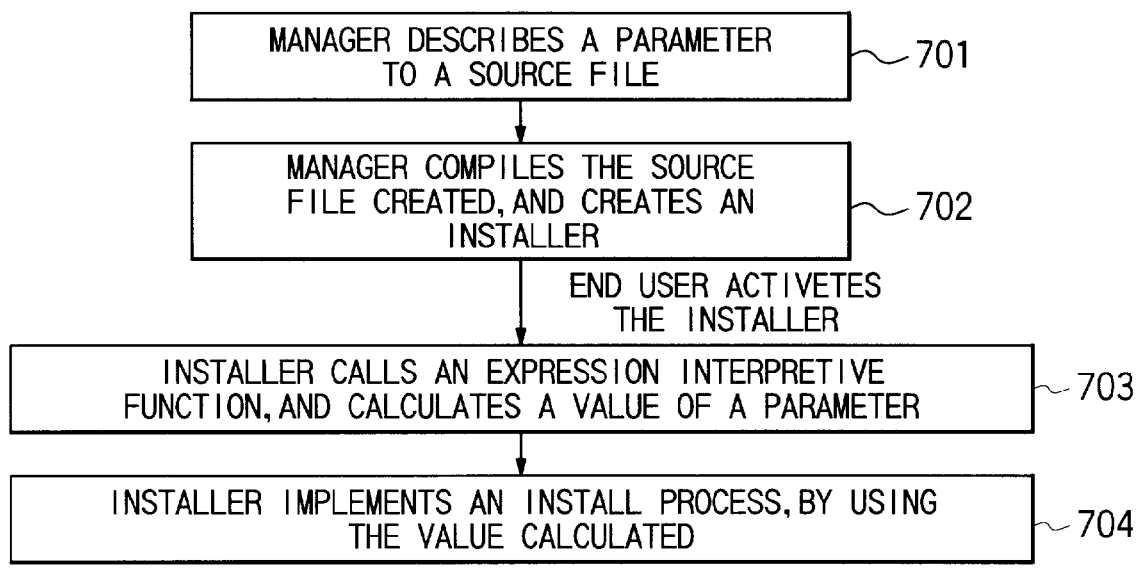
FIG. 7 is a flow diagram showing a method of installing by using the general purpose installer a computer program, in one example of which parameters are embedded in the source file and are compiled.

FIG. 7 is a flow diagram showing a method of installing a computer program by using in one example of the installer of the present invention wherein a parameter is embedded in a source file and compiled. In the following, the install method will be described with reference to FIG. 7.

A manager describes the parameter to a source file (step 701). Next, the manager creates an installer by compiling the source file (step 702). Herein, an end user will activate the installer. Then, the installer calculates a value of the parameter by calling an expression interpretive function (step 703). Thereafter, the installer implements an install process of the computer program by using the calculated parameter value (step 704).

Figure 8:
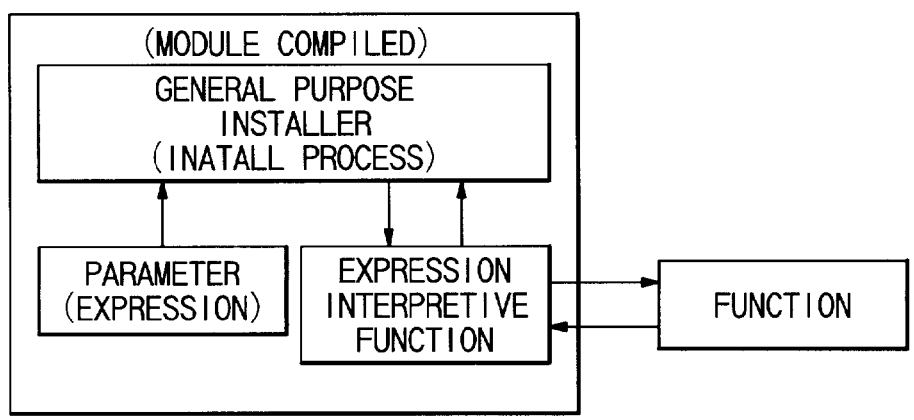
FIG. 8 is a schematic diagram showing a configuration of implementing the method of the install shown in FIG. 7.

FIG. 8 shows a configuration for implementing the install method shown in FIG. 7. Comparing the configuration of FIG. 8 with the configuration of FIG. 1, the parameter is provided in the configuration of FIG. 8 within the installer unlike the parameter of FIG. 1. That is, the embodiment of FIG. 8 is configured so that the parameter, unlike the parameter of FIG. 1, is embedded in the source file.

Figure 9:
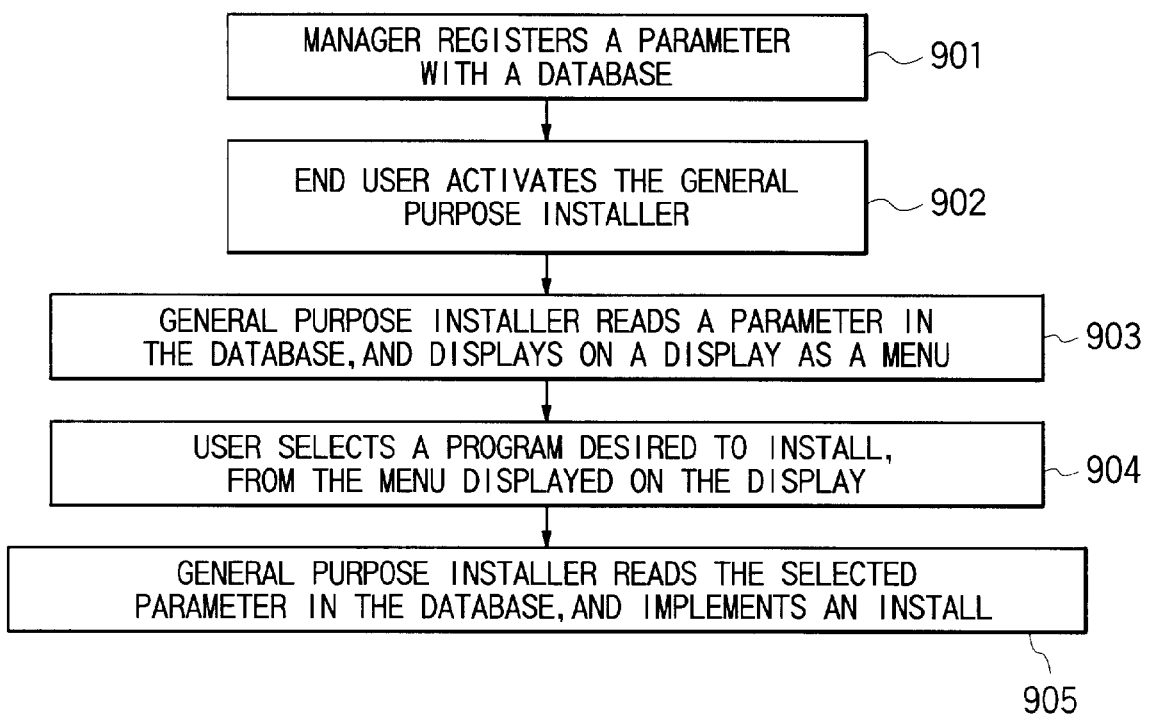
FIG. 9 is a flow diagram showing a method of installing by using the general purpose installer of the present invention a computer program, in one example of which the parameters are set in a database.

FIG. 9 is a flow diagram showing a method of installing a computer program by using the installer of the present invention, in one example of which a parameter is provided in a database. In the following, the install method will be described with reference to FIG. 9.

A manager registers the parameter with the database (step 901), an end user activates the installer (step 902), the installer reads the parameter existing in the database and displays it on the display as a menus (step 903), the end user selects a program to be installed from the menu displayed on the display (step 904), and the installer reads the parameter of the program selected from the database and implements an install process of the computer program in accordance with the content of the read parameter (step 905).

Figure 10:
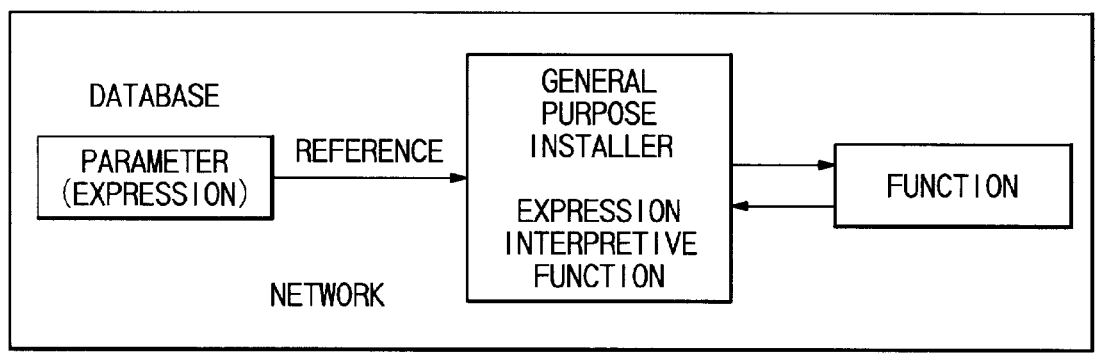
FIG. 10 is a schematic diagram showing a configuration which implements the method shown in FIG. 9.

FIG. 10 shows a configuration for implementing the method shown in FIG. 9. Comparing the configuration of FIG. 9 with the configuration of FIG. 1, the parameter of FIG. 8 is provided in the database in contrast to the parameter file of FIG. 1.

Figure 11:
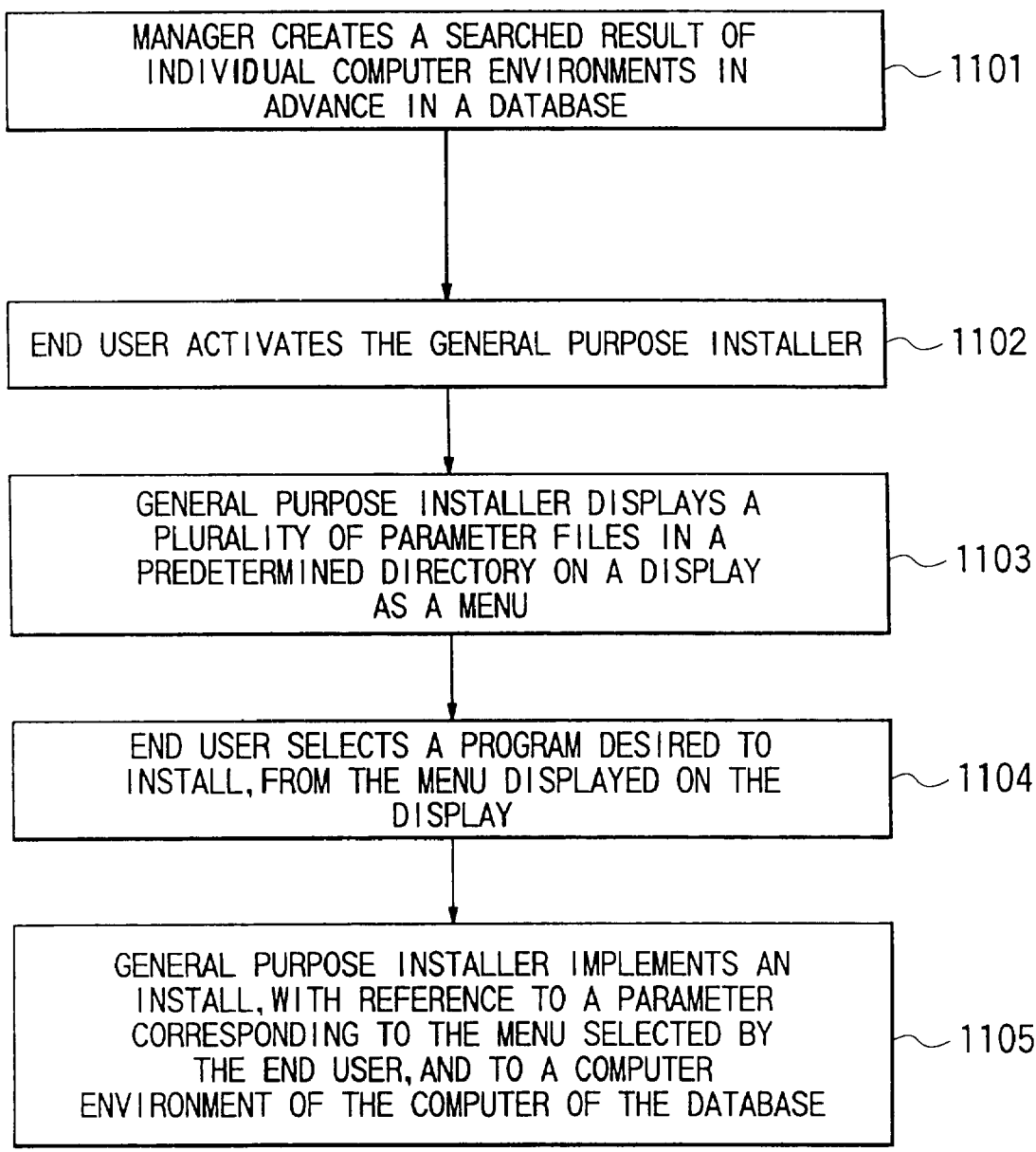
FIG. 11 is a flow diagram showing a method of installing a computer program by reading in an environment of a computer from a database and by using the general purpose installer of the present invention.

FIG. 11 is a flow diagram showing a method of installing a computer program by reading an environment of a computer from a database and using the installer of the present invention. In the following, the install method will be described with reference to FIG. 11.

A manager initially searches the environments of the individual computers and stores indications thereof in a database (step 1101). The manager saves a parameter file in a predetermined directory of a file server. An end user activates the installer (step 1102). The installer displays a plurality of parameter files existing in the predetermined directory as a menu (step 1103). The end user selects a program to be installed from the menu displayed on the display (step 1104). The installer implements an install process of the computer program with reference to the parameter file corresponding to the menu selected by the end user and to the indication of the environment of the end user's computer as stored in the database (step 1105).

Figure 12:
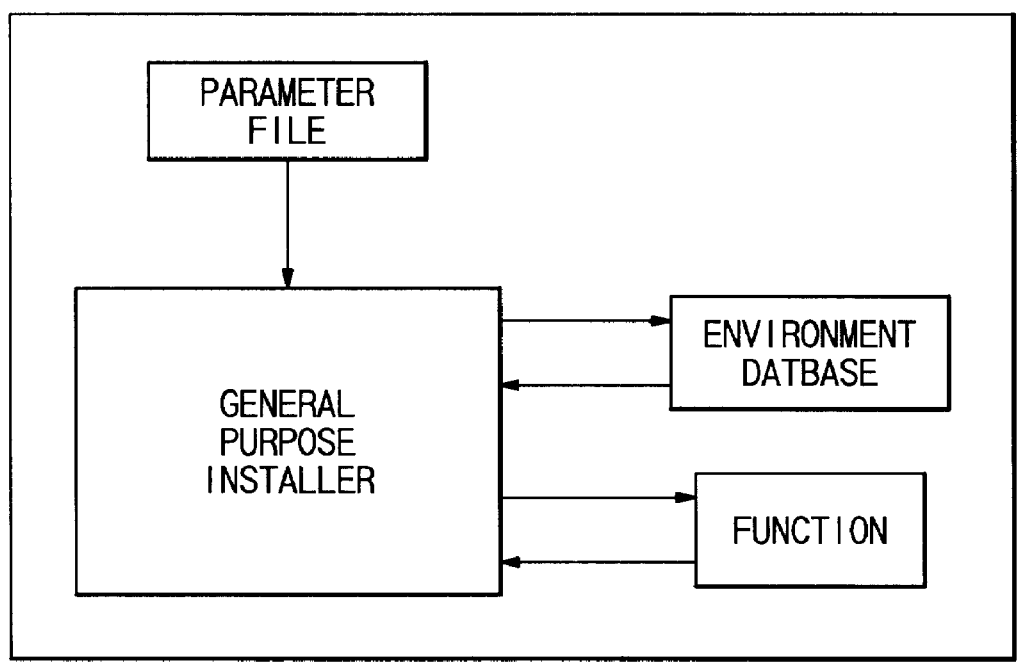
FIG. 12 is a schematic diagram showing a configuration which implements the install process of FIG. 11.

FIG. 12 shows a configuration for implementing the install process of FIG. 11. Comparing the configuration of FIG. 1 with the configuration of FIG. 12, it is apparent that the databases of the environments of individual computers are added. Other configurations are the same as the one of FIG. 1.

What is claimed is:

1. A method of installing a computer program, comprising the steps of:

embedding in advance a parameter into a source program;

compiling said source program embedded with said parameter; and properly installing a computer program with reference to an environment of a computer into which said computer program is installed by said source program which is compiled when said installing of said computer program is implemented.

* * * * *

UNITED STATES PATENT AND TRADEMARK OFFICE
CERTIFICATE OF CORRECTION

PATENT NO. : 6,178,551
DATED : January 23, 2001
INVENTOR(S) : Keishi Sana, et al.

It is certified that error appears in the above-identified patent and that said Letters Patent is hereby corrected as shown below:

On the Title Page, Item [75], inventor's name should read --Keishi Sana--.

Signed and Sealed this

Fifteenth Day of May, 2001

*Attest:*

NICHOLAS P. GODICI

*Attesting Officer*     *Acting Director of the United States Patent and Trademark Office*